United States Patent [19]

Norman

[11] Patent Number: 4,825,588
[45] Date of Patent: May 2, 1989

[54] LIGHTWEIGHT CORRUGATED PLANTER

[76] Inventor: Laurence L. Norman, 2740 Embassy Rd., Speedway, Ind. 46224

[21] Appl. No.: 863,002

[22] Filed: May 14, 1986

[51] Int. Cl.$^4$ .............................................. A01G 9/02
[52] U.S. Cl. ........................................ 47/66; 47/69; 119/61; 220/1 B; 220/5 A
[58] Field of Search ................... 47/66, 73, 69, 67, 68, 47/40; 220/5 A, 1 B, DIG. 25; 119/61

[56] References Cited

U.S. PATENT DOCUMENTS

| | | | |
|---|---|---|---|
| 726,766 | 4/1903 | Scheafer | 47/73 |
| 786,674 | 4/1905 | Polski | 220/DIG. 25 |
| 809,958 | 1/1906 | Kennedy | 220/5 A |
| 1,405,568 | 2/1922 | Conklin | 220/5 A |
| 2,280,537 | 4/1942 | Murphy | 119/61 |
| 2,501,980 | 3/1950 | Wolfe | 220/DIG. 25 |
| 3,370,379 | 2/1968 | Gleason | 47/67 |
| 4,133,442 | 1/1979 | Wiltshire et al. | 220/5 A |
| 4,244,486 | 1/1981 | Ewald, Jr. | 220/5 A |
| 4,395,845 | 8/1983 | Markowitz | 47/66 |

Primary Examiner—Robert A. Hafer
Assistant Examiner—Sam Rimell
Attorney, Agent, or Firm—William J. Bethurum

[57] ABSTRACT

This specification describes a novel apparatus and method of manufacture wherein a corrugated fiberglass trough is sealed between matching end walls, consisting of stand and plug members which have sealing surfaces which match the contour of the fiberglass trough. In this manner, the bonding strength between the above members is maximized, the cost of manufacture is minimized, and assembly is made with ease.

2 Claims, 3 Drawing Sheets

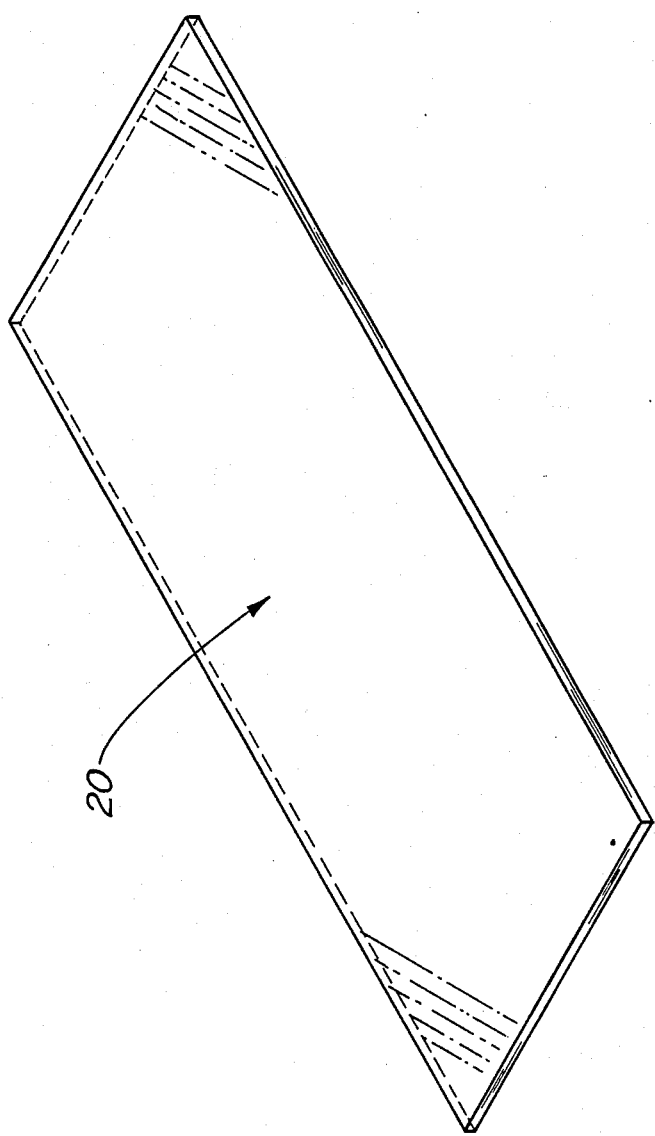

LIGHTWEIGHT CORRUGATED PLANTER

TECHNICAL FIELD

This invention relates generally to planters for both indoor and outdoor use. More particularly, the invention is directed to such a planter of rigid and durable construction and which is adapted for rapid, easy, and economical assembly.

BACKGROUND ART

There are many types of commercially available planters which include a central trough member supported at both ends, and sometimes in the center, by upstanding wall members. These planters are normally sold as either a completely assembled unit or in a build-it-yourself package, both usually of single material construction for the major components thereof. In either case, it is believed that the consumer cost of such items is somewhat high, and that the major component materials are not, generally speaking, characterized by a high structural integrity and durability commensurate with such high cost.

DISCLOSURE OF INVENTION

The general purpose of this invention is to provide a new and improved alternative construction to the above type of prior art planters, with such construction being characterized by a high structural integrity, a low cost of fabrication and assembly, an improved wear and lifetime, and easy assembly. To accomplish this purpose, I have discovered and developed a novel planter and method of manufacture wherein the main trough member is a sheet of corrugated fiberglass and the upstanding wall support members are configured from a selected durable polymer or other equivalent material and with a corrugated surface to match the corrugated surface of the fiberglass sheet. Advantageously, the end wall or support members for the main trough member may be made in two molds, one of which is configured as the lower stand member of the wall and the other of which is configured as the upper plug member of the wall. The surface of one of these members is provided with a groove which is adapted to receive a seal, and the corrugated fiberglass sheet is inserted between the plug and stand members and in intimate contact with the seal. The mutually abutting corrugated surfaces of these latter members provide for maximum bonding strength, as indicated in more detail below.

Normally, the trough will be supported at its center with only a stand member, and optionally, a glass cover may be laid in the trough and there supported by the uppermost corrugation of the fiberglass sheet. Thus, the above described trough and wall members may be purchased and molded, respectively, at a very low cost and then easily assembled to provide an attractive planter of durable construction. Such a planter is adapted for a variety of indoor and outdoor uses as will be more fully appreciated in the following description of the accompanying drawings.

BRIEF DESCRIPTION OF THE DRAWINGS

FIG. 1B is an isometric view of the glass cover for the planter of FIG. 1A.

BEST MODE FOR CARRYING OUT THE INVENTION

Figure 1A:
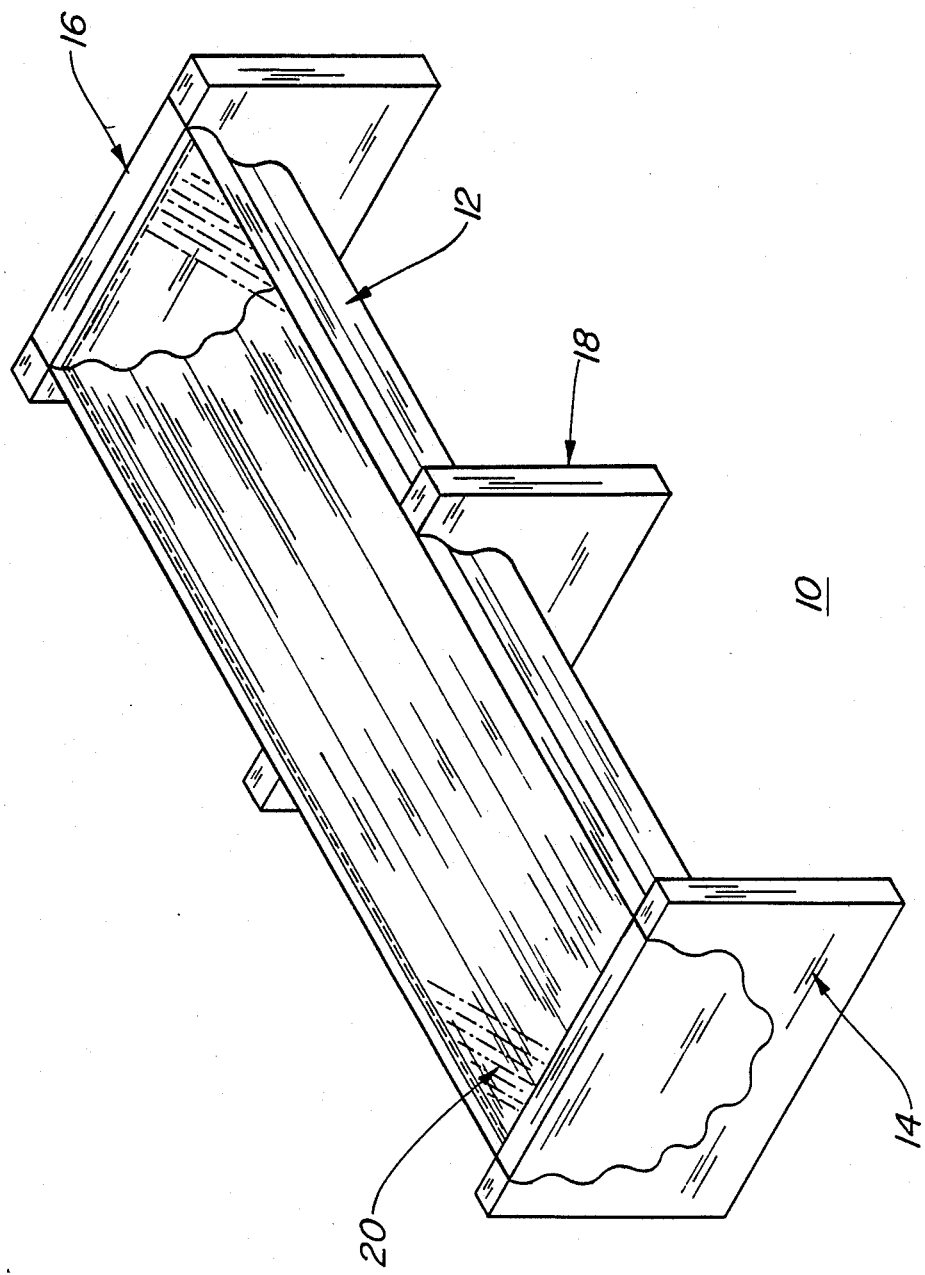
FIG. 1A is an assembled isometric view of the planter according to the present invention.

Referring now to FIG. 1A, the corrugated-type planter is designated generally as 10 and includes a corrugated fiberglass sheet 12 which forms the main trough member of the planter. The fiberglass sheet 12 is supported at its ends by stand support members 14 which are configured with corrugations to match the corrugations of both the fiberglass sheet 12 and the corrugations of the plug members 16 of the end walls. Normally, and depending upon the weight of material to be held by the trough 12, a center stand member 18 will be used as a center support for the trough as shown and may advantageously be made from the same molds used to make the end wall members therefor.

Optionally, a rectangular glass cover 20 as shown in FIG. 1B may be received by the top corrugation of the fiberglass sheet 12 and may be desirable, for example, when the planter is to be used as an aquarium or for certain outdoor applications to be described. In addition, it may be desirable to use an additional shelf (not shown) of a smaller rectangular size than the cover 20 and place this smaller shelf on one of the lower level corrugations in order to provide support for a plurality of pots and plants in certain greenhouse applications, for example. In such applications, one could cut a drain hole in the lower portion of the plug 16 and cut additional drain holes in the lower shelf in order to provide periodic watering and drainage for these plants.

Figure 2A:
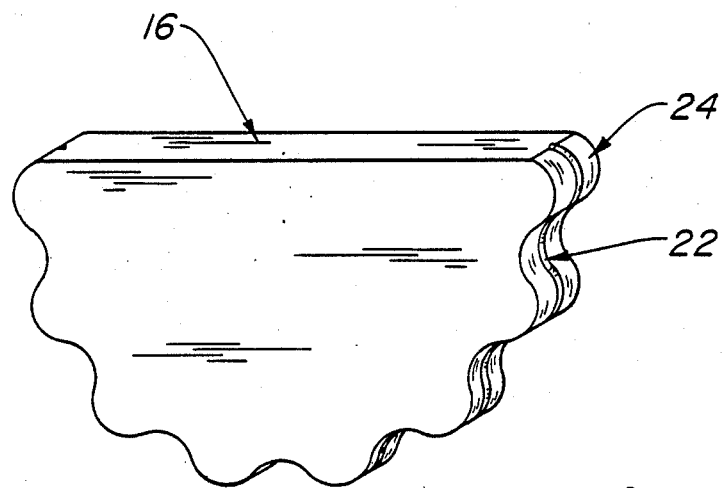
FIG. 2A is an isometric view of the plug member of the end wall of the planter.
Figure 2B:
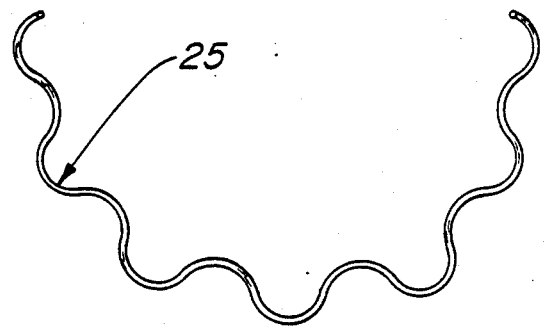
FIG. 2B is an isometric view of the partial O-ring
Figure 2C:
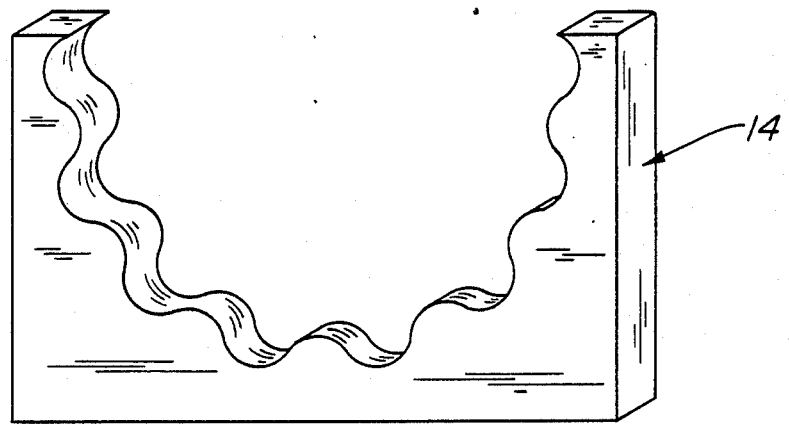
FIG. 2C is an isometric view of the stand member of the end wall of the planter.

Referring now to FIGS. 2A and 2B, the plug and stand members 16 and 14, respectively, may be made in molds having matching corrugated surfaces which also match the corrugated surface of the fiberglass sheet 12. One of these members, preferably the plug member 16, is molded to have a continuous semi-cylindrical groove 22 along the centerline of its end surface 24, and this groove 22 is adapted to receive a seal such as a partial O-ring 25 which is coextensive with the groove 22.

The spacing between the corrugated surfaces of the plug and stand members will normally be about $\frac{1}{8}$ inch, with the depth of the groove 22 being about 1/16 inch. Thus, by selecting a good strong and elastic O-ring seal with a compressability of about 50%, an excellent water-tight seal is provided between the plug and stand members 16 and 14 of the planter. However, it should be understood that the physical shape of the support member 14 will retain the fiberglass sheet 12 positioned in place on its corrugated surface as shown without using the plug 16. This latter construction may be desirable for long continuous liquid transport applications, such as irrigation.

In a preferred embodiment of my invention, I use blown polypropylene or polyethylene for the stand and plug members 14 and 16 respectively, and I use a fiberglass sheet 12 which is 26 inches in width and has center-to-center corrugations of $2\frac{1}{2}$ inches. The corrugated fiberglass sheet 12 may be purchased at most hardware or home materials stores and the particular type of fiberglass is not critical. Additionally, it will be noted that there is normally a close match in the thermal coefficient of expansion of most all fiberglass materials and the above polymer materials used for the end and center wall members. This close match in thermal coefficient provides for good tracking of expansion and contraction of these members over a wide range of temperatures which one may experience in a variety of outdoor applications.

In significant contrast to prior planters, the present planter may be completely sterilized for applications such as in tropical fish farms for breeding fish or in applications such as fruit and vegetable stacking and storage. In such applications, one would use a non-toxic sealer, such as silicone, between the plug and stand members previously described. In addition, these planter materials can be completely and repeatedly sterilized as compared to wood and certain other materials, However, in other and significantly diverse applications such as irrigation troughs, other types of sealer materials may be preferred.

The low cost, durability and long lifetime of the present invention makes it especially well suited for farm irrigation applications where long fiberglass sheets 12 may be purchased at readily available outlets and at a relatively low cost and then, together with the above support members, be rapidly assembled by non-skilled workers for a variety of farm irrigation or animal feeding uses.

Various modifications may be made in the above described embodiment of my invention, both in the fabrication and geometry thereof, without departing from the spirit and scope thereof. For example, a special saw such as one employing a high speed diamond saw blade may be used to cut corrigations for the end walls of the planter without requiring the use of molds. However, large scale manufacturing would dictate the use of molds from an economy standpoint. From a standpoint of variation in geometry, it may for example be desirable to increase the vertical extend of the fiberglass sheet 12 for an application such as a fish aquarium in order to increase the visability of the interior of the aquarium or to increase the volumetric capacity thereof.

Because of the fire retardant nature of the above component materials, planters may be adapted to receive heating or lighting elements to, for example, provide soil heating or aquarium lighting. Electric soil heating cables may be used in the bottomm of the planter for speeding the germination of seeds and rooting of cutting. In addition, other heat sources, such as solar cells, may be used outdoors in cold weather to reduce exposure to cold temperatures. In the use of solar cells, for example, these cells or solar panels may be mounted directly on the top glass cover in FIG. 1B or imbedded therein and then electro-thermally connected to the interior of the planter. The technology of mounting solar cells or panels to glass panels is now well developed and thus makes the latter application especially well suited for use with the present invention in cold weather outdoor heating applications.

Also, by using a flat glass cover as a means for supporting solar cells, this opens up the capability of depositing large-grain-boundary polycrystalline silicon on the glass surface in order to provide a somewhat inefficient, yet relatively inexpensive, PN junction forming material on the top plate 20. Such polycrystalline silicon depositionn processes are well known in the art. Then, the power obtained from these wide area PN junctions can be bled off via efficient circuits such as flex circuits, such as tape automated bond (TAB) bond circuits, to electrical-to-thermal transducers in order to provide heating and/or lighting to the interior of the planter, aquarium of the like.

Also, the above large grain boundary PN junction solar cell approach could be used to provide charge storage for batteries in the daytime when the sun is bright and then, by the use of timing means, bleed these batteries at night to maintain either a relatively constant or at least moderated fluctuation in temperature variation in the planter.

In case of lighting applications for aquariums, one could first deposit a thin layer of either polycrystalline or single crystal silicon on the surface of the glass cover 20 in FIG. 1B and then photolithographically distribute thin solar cell fingers to the PN junctions in accordance with well known junction coupling techniques to heat electrothermal transducers within the interior of the planter. The the case of lighting aquariums, it may be desirable to mount a few selectively spaced, well-chosen and focused small lights on the transparent top plate or cover 20 in order to provide lighting to the interior of the structure.

There is another point of unique construction that should be emphasized, and this point relates to maximizing the strength of the seal between the stand, plug and fiberglass members. Since the surfaces of these members at point of seal are corrugated, the mutually-sealed or bonded surface areas are maximized in comparison to, say, a plain cylindrical surface. This maximization of surface area, in turn, serves to maximize the total sealing or bonding strength between these above members. This improvement is accomplished by taking advantage of the readily and economically available corrugated fiberglass materials and then matching these corrigations to those of the end and center wall members.

In addition to the above optimization in sealing strength, the corrugated fiberglass surfaces will support a longer span lengthwise than a purely cylindrical surface, and this is true because there is, lengthwise, a greater support area, A, per unit volume, V, contained within the interior fiberglass structure.

It will also be appreciated that the present invention is not limited by the particular molding technique used for forming the stand and plug members of the above described supporting walls. For example, these components may be provided by molding processes known to those skilled in these arts, such as applying chosen mold liquids to cold molds or by applying powder mold materials to hot molds.

Finally, the above generally potential widespread use, application and novelty of the present invention is matched only by the widespread availability of the major component material used therein—namely corrugated fiberglass. Thus, I estimate that there are at least 20,000 retain outlets and at least 600 wholesale outlets in the United States which supply corrugated fiberglass which is suitable for use in the present invention. These materials may be purchased in a variety of colors which suit and match indoor colors, or they may be obtained in the most raw material form for outdoor applications, such as for irrigation or food storage use. Thus, the practice of this invention is rendered easy to achieve and in a variety of colors and specific geometrical configurations which may be dictated by the particular application of the invention as described above.

INDUSTRIAL APPLICABILITY

The present invention is especially well suited for use in large or small irrigation applications where there is a need for the rapid and economical construction of water flow channels by non-skilled workers. These channels may be rapidly assembled and disassembled by non-skilled workers and employed in the area of need with a minimum of effort. For example, if a particular field is to be irrigated, the materials requirement may easily be made commensurate with the field size, water flow necessity and capacity, and the availability of manpower to switch these containers from field to field.

I claim:

1. A planter assembly, comprising:

a single sheet of flexible corrugated fiberglass having end portions and side portions and corrugated interior and exterior surfaces, said sheet being symmetrically curved to form a generally hemispherical cross section;

stand members attached to said side portions of said single sheet, said stand members being longitudinally spaced and each having generally hemispherical cutouts, the contour of said cutouts matching the exterior corrugations of said sheet; plug members attached to the end portions of said single sheet and having flat side surfaces and a top surface, a lower surface of said plug members having a contour matching the corrugations of said inner surface of said single sheet, the lower surface of each of said plug members including a continuous groove;

a flexible sealing strip connected to said groove of each of said plug members and adapted to provide a seal between said single sheet and each of said plug members.

2. The planter assembly of claim 1 further including a flat cover plate.

* * * * *